United States Patent
Chadha

(10) Patent No.: US 7,218,249 B2
(45) Date of Patent: May 15, 2007

(54) HAND-HELD COMMUNICATION DEVICE HAVING NAVIGATION KEY-BASED PREDICTIVE TEXT ENTRY

(75) Inventor: Lovleen Chadha, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 540 days.

(21) Appl. No.: 10/864,750

(22) Filed: Jun. 8, 2004

(65) Prior Publication Data

US 2005/0270270 A1    Dec. 8, 2005

(51) Int. Cl.
*H03M 7/00* (2006.01)
(52) U.S. Cl. .................. 341/23; 345/168; 345/171; 345/467; 382/230; 341/22
(58) Field of Classification Search .................. 341/20, 341/22, 23; 345/168, 171, 467; 382/230
See application file for complete search history.

(56) References Cited

U.S. PATENT DOCUMENTS

| | | | |
|---|---|---|---|
| 5,128,672 A | 7/1992 | Kaehler | 341/23 |
| 5,483,235 A | 1/1996 | Hanson et al. | 341/20 |
| 5,574,482 A | 11/1996 | Niemeier | 345/173 |
| 5,677,949 A * | 10/1997 | Macor | 379/354 |
| 5,748,512 A | 5/1998 | Vargas | 364/709.12 |
| 5,797,098 A | 8/1998 | Schroeder et al. | 455/464 |
| 5,881,169 A | 3/1999 | Henry, Jr. | 382/187 |
| 5,963,671 A * | 10/1999 | Comerford et al. | 382/230 |
| 6,016,142 A | 1/2000 | Chang et al. | 345/334 |
| 6,052,070 A * | 4/2000 | Kivela et al. | 341/22 |
| 6,169,538 B1 | 1/2001 | Nowlan et al. | 345/168 |
| 6,232,969 B1 * | 5/2001 | Fawcett | 345/467 |
| 6,307,541 B1 | 10/2001 | Ho et al. | 345/171 |
| 6,359,572 B1 | 3/2002 | Vale | 341/23 |
| 6,573,844 B1 | 6/2003 | Venolia et al. | 341/22 |
| 6,621,424 B1 * | 9/2003 | Brand | 341/22 |
| 6,639,586 B2 | 10/2003 | Gerpheide | 345/173 |
| 6,646,572 B1 | 11/2003 | Brand | 341/22 |
| 6,654,733 B1 | 11/2003 | Goodman et al. | 706/52 |
| 6,724,370 B2 | 4/2004 | Dutta et al. | 345/169 |
| 7,075,519 B2 * | 7/2006 | Hsi | 345/168 |

* cited by examiner

Primary Examiner—Albert K. Wong

(57) ABSTRACT

A hand-held communication device provides navigation key-based predictive text entry. The hand-held communication device includes a housing generally sized to be held in a human hand having a display disposed for displaying characters selectable for entry in a character position of a text string being entered and a navigation key assembly for scrolling through and selecting from the characters displayed by the display. The characters displayed by the display during text entry are arranged according to the probability of selection of each character for entry in the character position so that the character with the highest probability of selection is selected with a single input from the navigation key assembly.

27 Claims, 10 Drawing Sheets

| | | | | | | | |
|---|---|---|---|---|---|---|---|
| 1 | Abstract | 41 | contents | 81 | implemented | 121 | networks | 161 | Signature: |
| 2 | access | 42 | cost | 82 | implies | 122 | Nokia | 162 | solid-brick |
| 3 | accesses | 43 | covers | 83 | IN | 123 | not | 163 | Sony-Ericsson |
| 4 | accessible | 44 | Date | 84 | INFORMATION | 124 | noted | 164 | sorts |
| 5 | acts | 45 | depicted | 85 | Information: | 125 | OF | 165 | standardization |
| 6 | advantage | 46 | describes | 86 | innovation | 126 | on | 166 | SUBJECT |
| 7 | all | 47 | Details: | 87 | interaction | 127 | one | 167 | subscriber |
| 8 | allow | 48 | device | 88 | intercontinental | 128 | only | 168 | subscribers |
| 9 | allows | 49 | DISCLOSED | 89 | interface | 129 | Opportunities: | 169 | such |
| 10 | Already | 50 | DISCLOSURE | 90 | interfaces | 130 | opportunity | 170 | system |
| 11 | alternative | 51 | display | 91 | international | 131 | or | 171 | talk |
| 12 | an | 52 | distance | 92 | invention | 132 | ordinary | 172 | telephone |
| 13 | And | 53 | Dumb | 93 | Inventor's | 133 | other | 173 | that |
| 14 | any | 54 | effective | 94 | involves | 134 | out | 174 | the |
| 15 | ANYONE | 55 | embedded | 95 | is | 135 | OUTSIDE | 175 | There |
| 16 | applied | 56 | Embodiment | 96 | It | 136 | PART | 176 | these |
| 17 | APPROVED | 57 | Ericsson | 97 | ITS | 137 | participate | 177 | they |
| 18 | are | 58 | etc | 98 | just | 138 | phones | 178 | This |
| 19 | areas | 59 | EXCEPT | 99 | keypad | 139 | Potential | 179 | time |
| 20 | AS | 60 | exists | 100 | licensed | 140 | press | 180 | to |
| 21 | assemblies | 61 | factors | 101 | licensing | 141 | proprietary | 181 | together |
| 22 | at | 62 | fastest | 102 | like | 142 | provide | 182 | two |
| 23 | audio | 63 | figure | 103 | likely | 143 | provides | 183 | typical |
| 24 | Background | 64 | figures | 104 | limited | 144 | providing | 184 | UNDER |
| 25 | based | 65 | first | 105 | listen | 145 | PSTN | 185 | used |
| 26 | be | 66 | for | 106 | long | 146 | PTT | 186 | user |
| 27 | become | 67 | form | 107 | major | 147 | PTT-Client | 187 | users |
| 28 | between | 68 | functionality | 108 | manage | 148 | pulled | 188 | using |
| 29 | by | 69 | Gateway | 109 | MATTER | 149 | purpose | 189 | vendors |
| 30 | calls | 70 | great | 110 | may | 150 | Push-to-talk | 190 | wants |
| 31 | can | 71 | growth | 111 | means | 151 | required | 191 | whoever |
| 32 | cellular | 72 | GSM | 112 | mechanisms | 152 | sake | 192 | WHOLE |
| 33 | chat | 73 | handsets | 113 | merely | 153 | Samsung | 193 | wired |
| 34 | Client | 74 | he | 114 | method | 154 | server | 194 | wireless |
| 35 | clients | 75 | here | 115 | mobile | 155 | services | 195 | wireline |
| 36 | competitive | 76 | highly | 116 | more | 156 | session | 196 | with |
| 37 | concept | 77 | However | 117 | Motorola | 157 | should | 197 | Witness |
| 38 | CONFIDENTIAL | 78 | huge | 118 | must | 158 | shown | 198 | working |
| 39 | connected | 79 | I/O | 119 | name | 159 | Siemens | | |
| 40 | consists | 80 | illustration | 120 | network | 160 | Signature | | |

FIG. 11

| | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| | 2 | 10 | 3 | 2 | 3 | 2 | 1 | 7 | 1 | 1 | 0 | 14 | 2 | 1 | 0 | 1 | 0 | 0 | 0 | 0 | 0 | 0 | 0 | 0 | 0 | 0 |
*FIG. 13*
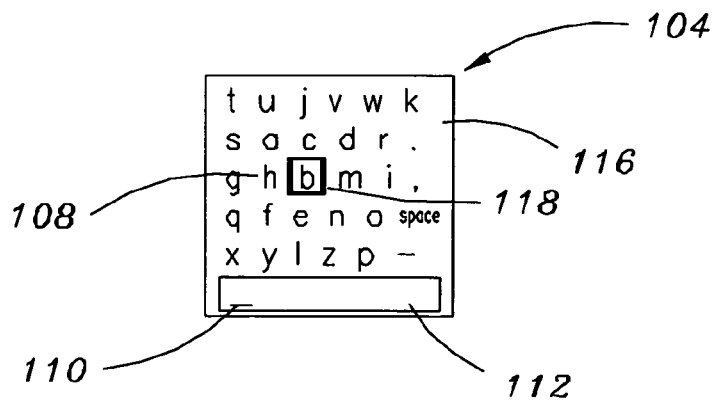
*FIG. 14*
| | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| | 5 | 0 | 0 | 0 | 2 | 0 | 0 | 0 | 2 | 0 | 0 | 0 | 0 | 1 | 0 | 0 | 0 | 0 | 0 | 0 | 0 | 0 | 0 | 0 | 0 | 0 |
*FIG. 15*
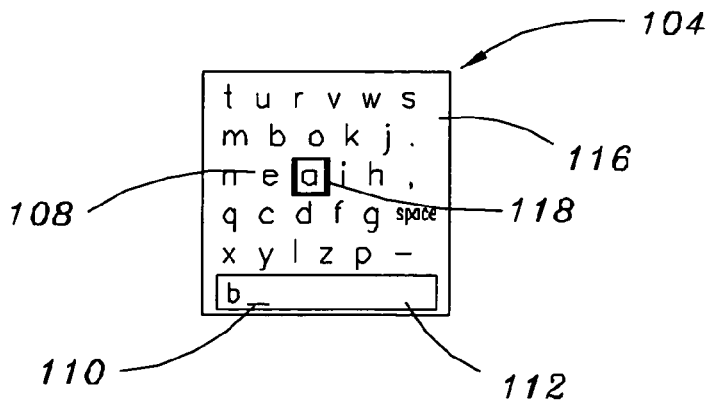
*FIG. 16*

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| 0 | 0 | 0 | 1 | 0 | 0 | 0 | 0 | 0 | 0 | 0 | 0 | 0 | 1 | 0 | 0 | 0 | 3 | 0 | 0 | 0 | 0 | 0 | 0 | 0 | 0 |
FIG. 17
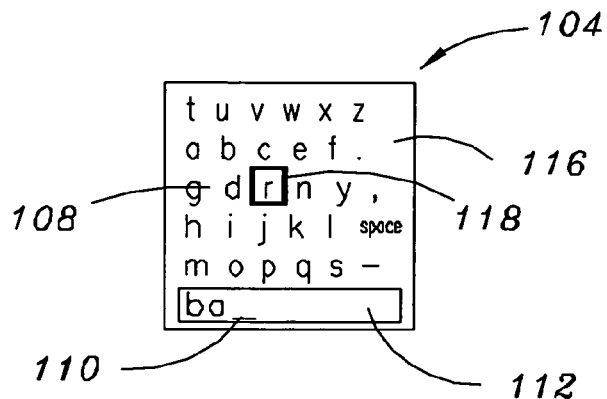
FIG. 18
| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
FIG. 19
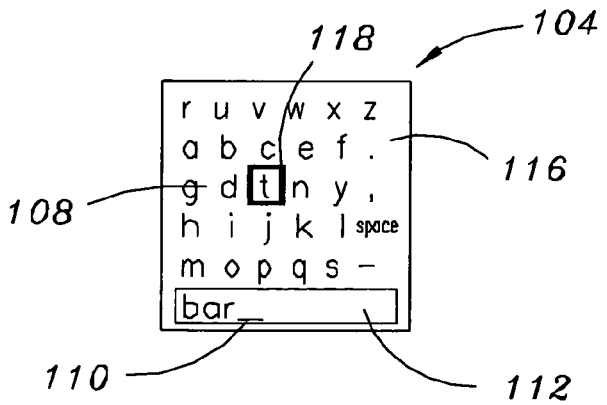
FIG. 20

HAND-HELD COMMUNICATION DEVICE HAVING NAVIGATION KEY-BASED PREDICTIVE TEXT ENTRY

BACKGROUND OF THE INVENTION

The present invention relates generally to hand-held communication devices such as mobile telephones, pagers, or the like, and more particularly, to a hand-held communication device employing navigation key-based predictive text entry.

Wireless hand-held communication devices, in particular mobile telephones, have typically employed a twelve-key numerical keypad, providing the numbers 0 through 9 and the star ("*") and pound ("#") symbols. Where text entry is desired, such as in mobile telephones providing SMS (Short Message Service), EMS (Enhanced Message Service), MMS (Multi-media Message Service) messaging or IM (Instant Message) capability, one or more non-numeric characters (e.g., the letters of an alphabet, logographic symbols, or the like) are mapped to keys of the numeric keypad. For example, in mobile telephones providing text entry using the English alphabet, the letters "A" though "Z" are mapped to the numeric keys "2" though "9." In this manner, all twenty-six letters of the English alphabet are accommodated by the twelve keys of the keypad to furnish alphanumeric text entry. However, using such character mapping techniques, multiple taps of the keys of the keypad are often required for entry of a non-numeric character, greatly increasing the time required for text entry.

As a result, predictive text entry techniques such as Tegic Communication's T9 text entry, Eatoni Ergonomics' LETTERWISE text entry, and the like, have been developed for entering non-numeric text using a twelve-key numeric keypad. Such predictive text entry techniques attempt to predict which letter mapped to a particular key of the keypad is most likely to be selected when the key is pressed during entry of text. In this manner, the number of key taps required to enter non-numeric text is reduced compared to conventional multi-tap text entry.

Often, it is desirable to provide hand-held communication devices, particularly mobile telephones, having extremely small form factors or aesthetically pleasing shapes. In such hand-held communication devices, the provision of a conventional twelve-key numeric keypad is often either impossible or undesirable. Consequently, the hand-held communication devices typically rely on menu driven displays and voice-recognition technologies such as voice-dialing and voice-entered commands in combination with a simple navigation key assembly instead of a full twelve-key keypad. However, in such devices, text messaging, if supported, requires extensive scrolling through a fixed character menu, and repeated keystrokes to select characters for a text message being composed.

Consequently, it is desirable to provide a predictive text entry using only the navigation and selection controls (e.g., two, four or five-way navigation keys, track wheels, jog dials, joy sticks, or the like) of a navigation key assembly that is suitable for use with hand-held communication devices having a highly reduced set of keys, such as, for example, mobile telephones that do not include a traditional twelve-key numeric keypad.

SUMMARY OF THE INVENTION

The present invention is directed to a hand-held communication device employing navigation key-based predictive text entry. The present invention is also directed to methods for navigation key-based text entry suitable for use by hand-held communication devices having a reduced set of keys, particularly, hand-held communication devices that do not employ a traditional twelve-key numeric keypad.

In one specific embodiment, the invention provides a hand-held communication device providing navigation key-based predictive text entry. The hand-held communication device includes a housing generally sized to be held in the hand, a display for displaying characters selectable for entry in a character position of a text string being entered and a navigation key assembly for scrolling through and selecting from the characters displayed by the display during text entry. The characters displayed by the display are arranged according to the probability of selection of each character for entry in the character position so that the character with the highest probability of selection is selected with a single input from the navigation key assembly. Characters other than the character with the highest probability of selection are positioned according to the probability of selection of the character so that characters with a higher probability of selection are positioned closer to the character with the highest probability of selection, and characters having a lower probability of selection are positioned farther from the character having the highest probability of selection, thereby reducing the number of keystrokes to select and enter a character in the text string.

In another specific embodiment, the invention provides a method for entering a text string using the navigation key assembly of a hand-held communication device. In accordance with the method, characters for entry in a character position within the text string are displayed on a display of the hand-held communication device. The characters are arranged on the display according to the probability of selection of each character so that the character with the highest probability of selection is positioned to be selected with a single input from the navigation key assembly and characters other than the character with the highest probability of selection are positioned according to the probability of selection of the character so that characters with a higher probability of selection are positioned closer to the character with the highest probability of selection, and characters having a lower probability of selection are positioned farther from the character having the highest probability of selection. If the character with the highest probability of selection is to be selected, the character is entered via a single input from the navigation key assembly. However, if a character other than the character with the highest probability of selection is to be selected, the navigation key assembly is used to scroll to the character and enter the character.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWINGS

FIG. 11 is a diagrammatic illustration of a dictionary of words used by a prediction engine of the hand-held communication device illustrated in FIGS. 3 through 10 for providing navigation key-based predictive text entry;

FIG. 13 is a diagrammatic illustration depicting an exemplary letter occurrence count table for use by a prediction engine employing a prefix-based context scheme for determining the probability of selection of characters for the first character position of a word of a text string;

FIG. 14 is a plan view of the display of the hand-held communication device shown in FIG. 1, illustrating an exemplary table providing candidate characters for selection by the user for entry in the first character position of a word of a text string being composed;

FIG. 15 is a diagrammatic illustration depicting an exemplary letter occurrence count table for use by a prediction engine employing a prefix-based context scheme for determining the probability of selection of characters for the second character position of a word of a text string;

FIG. 16 is a plan view of the display of the hand-held communication device shown in FIG. 1, illustrating an exemplary table providing candidate characters for selection by the user for entry in the second character position of a word of a text string being composed;

FIG. 17 is a diagrammatic illustration depicting an exemplary letter occurrence count table for use by a prediction engine employing a prefix-based context scheme for determining the probability of selection of characters for the third character position of a word of a text string;

FIG. 18 is a plan view of the display of the hand-held communication device shown in FIG. 1, illustrating an exemplary table providing candidate characters for selection by the user for entry in the third character position of a word of a text string being composed;

FIG. 19 is a diagrammatic illustration depicting an exemplary letter occurrence count table for use by a prediction engine employing a prefix-based context scheme for determining the probability of selection of characters for the fourth character position of a word of a text string;

FIG. 20 is a plan view of the display of the hand-held communication device shown in FIG. 1, illustrating an exemplary table providing candidate characters for selection by the user for entry in the fourth character position of a word of a text string being composed;

DETAILED DESCRIPTION OF SPECIFIC EMBODIMENTS

The present invention provides navigation key-based predictive text entry for a hand-held communication device having a display and navigation key assembly. Instead of typing letters using a conventional alphanumeric keypad, twelve-key keypad, or the like, a user of the hand-held communication device navigates among characters displayed by the display and selects characters for entry in the text string being composed. The navigation key-based text entry of the present invention provides an intelligent logic for arranging characters displayed by the display. A prediction engine determines the arrangement of the characters displayed. Based on the context of the text string, the prediction engine determines a probability of selection for each character of the character set being used for entry in the next character position within the text string. Characters with the highest probabilities of selection are positioned to allow their selection with minimal keystrokes, thus reducing the number of keystrokes required to enter the text string. Reference will now be made in detail to the presently preferred embodiments of the invention, examples of which are illustrated in the accompanying drawings.

Figure 1:
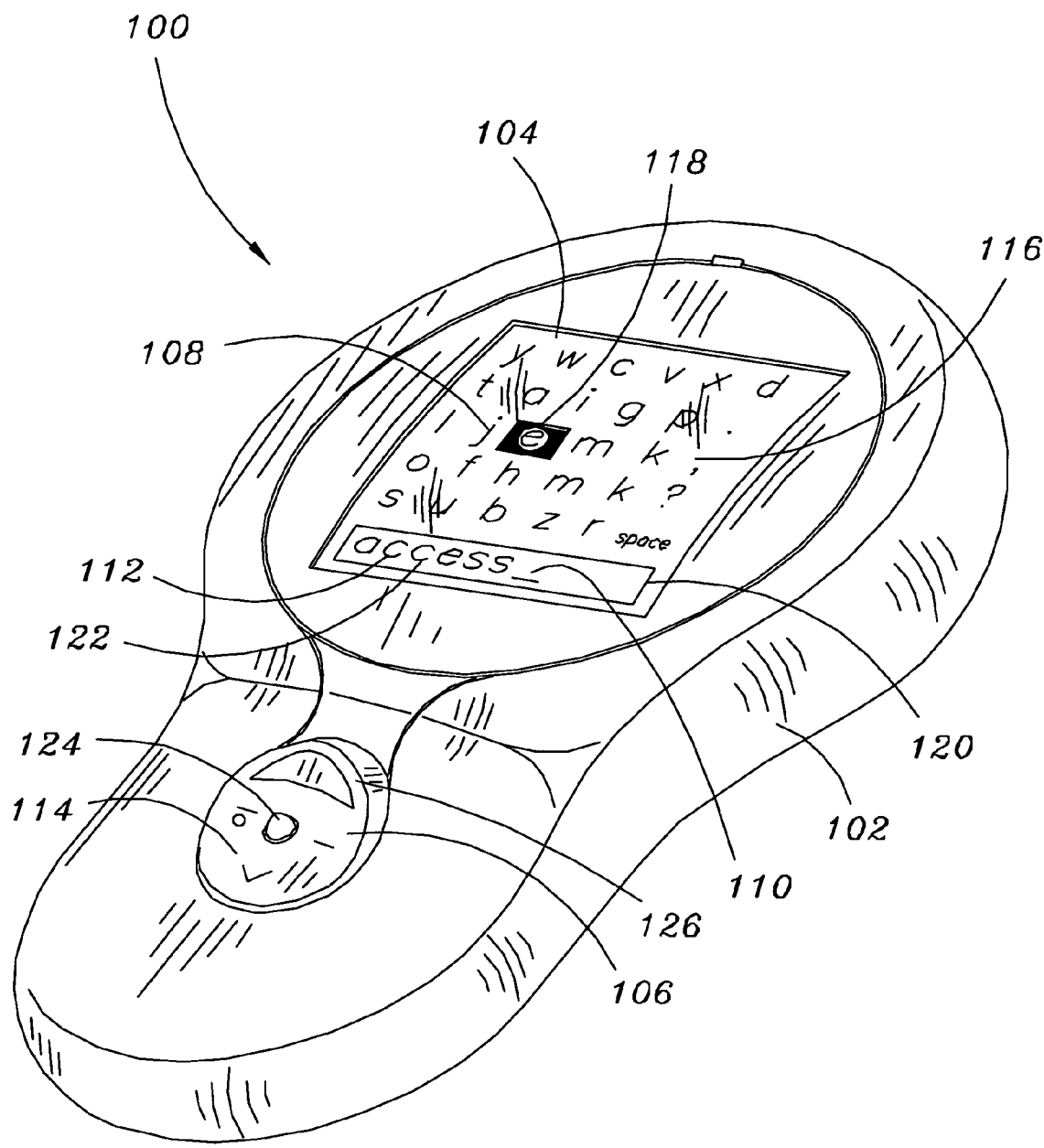
FIG. 1 is an isometric view illustrating a hand-held communication device employing navigation key-based predictive text entry in accordance with an exemplary embodiment of the present invention.

FIG. 1 depicts an exemplary hand-held communication device 100 providing navigation key-based predictive text entry in accordance with the present invention. The hand-held communication device 100 includes a housing 102 generally sized and shaped to be held within the hand during use. The housing 102 includes a display 104 and a navigation key assembly 106. The display 104 is capable of displaying characters 108 such as letters, logographic characters or symbols, and the like, selectable for entry in character positions 110 of a text string 112 being composed. The display 104 may employ any suitable flat panel display technology, including but not limited to, monochromatic or color liquid crystal display (LCD) technologies, plasma display technologies, or polymer light emitting diode (PLED) display technologies. The navigation key assembly 106 includes one or more navigation and selection keys, a two-, four- or five-way navigation key (a five-way navigation key 114 is illustrated), a track wheel, a jog dial, a joystick, or the like, for scrolling through and selecting from the characters 108 displayed by the display 104 thereby allowing the user to compose the text string without the use of a conventional keypad or keyboard.

The hand-held communication device 100, which in a preferred embodiment comprises a mobile telephone, may further include components for providing wireless communication of voice and text information with external sources such as a base station, a cellular communication system tower, a second hand-held communication device, or the like. For example, the hand-held communication device 100 may comprise a processing system, memory, a transmitter/receiver assembly or transceiver, an antenna, a data card reader for receiving a data card (e.g., a subscriber identification module (SIM) card or a user identification module (UIM) card), a power source such as a battery, and the like.

In the embodiment illustrated, the hand-held communication device 100 does not include a conventional numeric keypad, a touch-screen or digitizer overlaying the display 104, or other input device, since the navigation key-based predictive text entry methods of the present invention are suitable for use by hand-held communication devices that provide a highly reduced set of keys and that do not include touch-screen or digitizer assemblies. Nevertheless, the navigation key-based predictive text entry methods of the present invention are not limited to use by the specific hand-held communication device 100 illustrated, and it is contemplated that the present invention may be implemented in hand-held communication devices including more extensive keypads, including, but not limited to, multiple key navigation key assemblies, twelve-key numeric keypads, alphanumeric keypads, and the like, and/or displays having a touch-screen or digitizer overlaying the display area, without departing from the scope and intent of the present invention.

Figure 2:
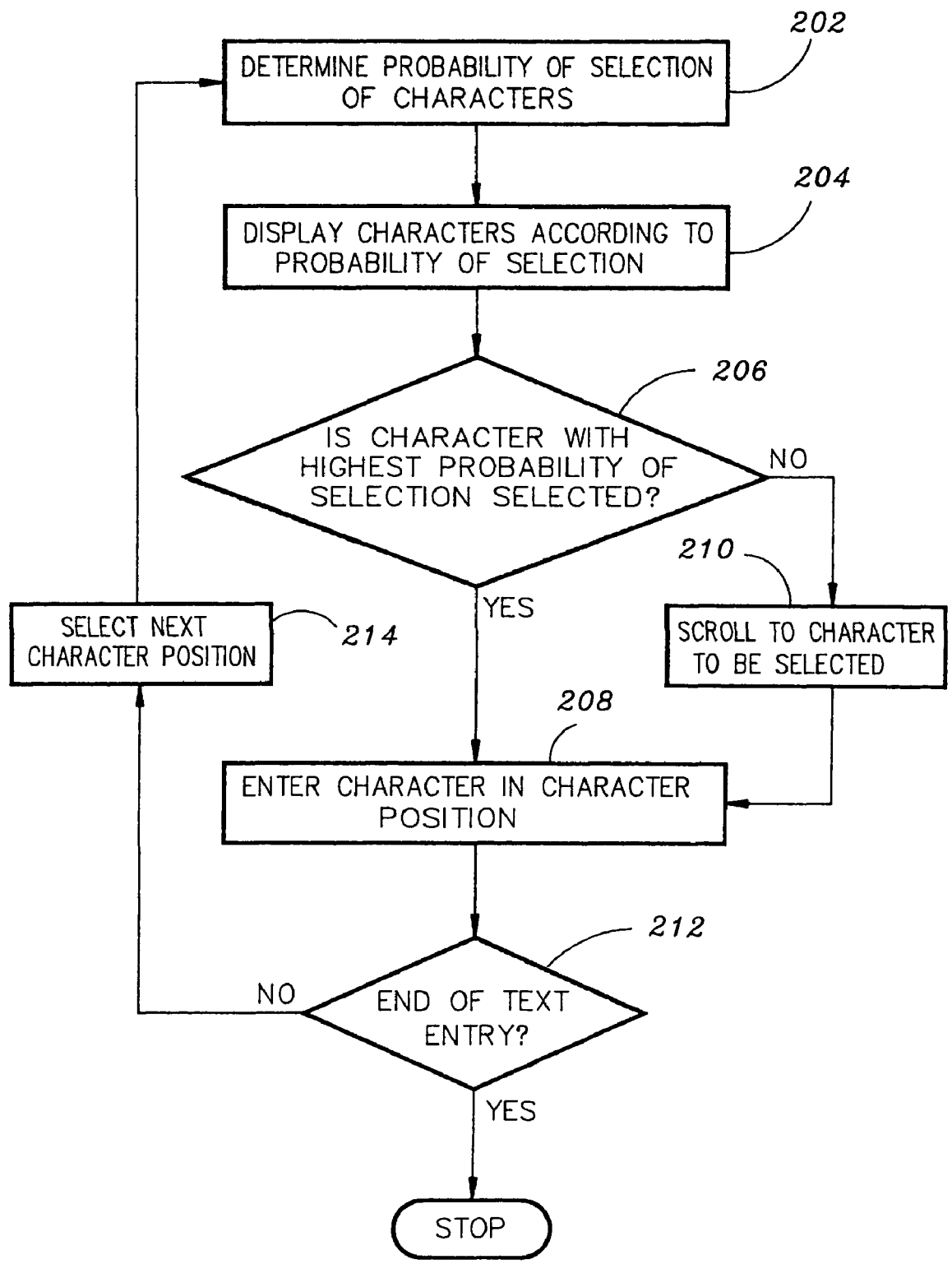
FIG. 2 is a flow chart illustrating a method for providing navigation key-based predictive text entry in accordance with an exemplary embodiment of the present invention.

FIG. 2 illustrates an exemplary method 200 employing navigation key-based predictive text entry in accordance with the present invention for entering a text string using the navigation key assembly of a hand-held communication device, such as the hand-held communication device 100 shown in FIG. 1. In accordance with the method 200 shown, the probability of selection of characters for entry in a given character position within a text string being composed is determined, at step 202. The characters are then displayed on the display of the hand-held communication device, at step 204, arranged on the display according to the probability of selection of each character, e.g., in tabular form, in list form, in a menu format, or the like. For example, during text entry, such as while entering an SMS, EMS or MMS message, an IM, or the like, a software or firmware-based prediction engine executed by the processing system of the hand-held communication device 100, calculates the probability of selection of characters for entry in successive character positions within the text string based on a predefined dictionary of words. The prediction engine then causes the characters 108 to be displayed by the display 104 arranged by the probability of selection of each character 108 for entry in the next open character position 110 of the text string 112.

In the specific embodiment illustrated, characters 108, comprising letters of the English alphabet, are arranged in a table 116 employing a grid-based tabular format. However, it will be appreciated that other arrangements of characters may be provided. For example, characters 108 may be arranged in a list format, a tabular format employing a honeycomb arrangement of hexagonal cells, wherein characters are placed in adjoining cells, a menu structure, or the like, without departing from the scope and intent of the present invention. A text entry area 120 is provided adjacent to the table 116 for displaying the text string 112 being entered. The text string 112 is formed of letters 122 selected from the candidate letters (i.e., characters 108) displayed by the table.

Preferably, the character with the highest probability of selection is displayed as a default character 118 that may be selected with a single input from the navigation key assembly. For example, in the embodiment illustrated in FIG. 1, the character with the highest probability of selection or default character 118 is positioned at or near the center of the table and is marked or highlighted as for selection so the user may select the character by pressing the center portion 124 of the five-way navigation key 114. In the specific example shown, the letter "e" is determined to have the highest probability of selection for entry in the next character position of the text string. Accordingly, the letter "e" is centered in the table and boxed or highlighted for selection. Characters other than the character with the highest probability of selection (i.e., the letters "m", "k", "a", "c", etc.) are positioned according to the probability of selection of the character so that characters with a higher probability of selection are positioned closer (e.g., adjacent to) to the character with the highest probability of selection, and characters having a lower probability of selection are positioned farther from the character having the highest probability of selection. Thus, in the specific example shown, the letters having the second, third, fourth and fifth highest probability of selection (e.g., the letters "m", "j", "i" and "h") are positioned adjacent to the letter "e", while letters having lower probabilities of selection (e.g., the letters "y", "s", "x" and "d", etc.) are positioned farther away from the letter "e". In this manner, the number of keystrokes required to navigate to and select a character is more likely to be minimized.

The user then selects the desired character for entry into the character space within the text string. If the default character 118 (i.e., the character with the highest probability of selection) is the desired character, at step 206, the user can select and enter this character, at step 208, via a single input from the navigation key assembly (e.g., by depressing the center 124 of the five-way navigation key 114). However, if a character other than the character with the highest probability of selection is to be selected, at step 206, the user can select this character by using the navigation key assembly to navigate or scroll to the character (e.g., by pressing the up, down, left and right sides of the five-way navigation key 114), at step 210. The character is then entered, at step 208, via an input to the navigation key assembly (e.g., by depressing the center 124 of the five-way navigation key 114). The next character position of the text string is selected, at steps 210 and 212, and method 200 is repeated until the text string is entered (e.g., until a space or punctuation symbol is selected, or the like).

Figure 3:
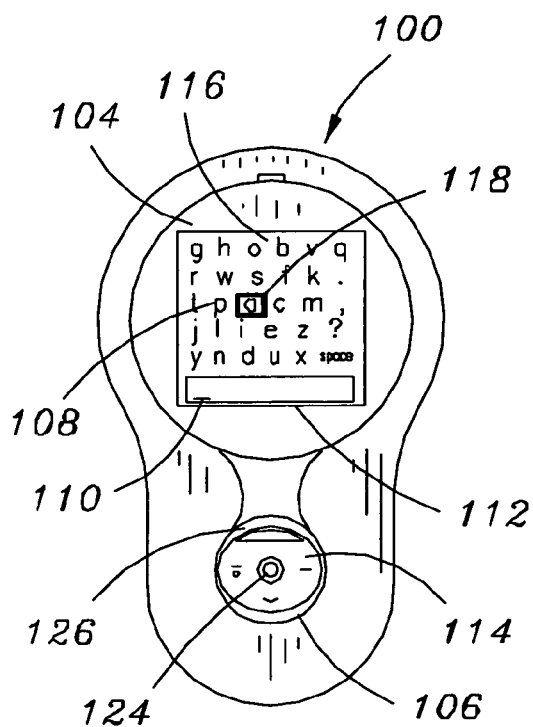
FIGS. 3 through 10 are top plan views of the hand-held communication device shown in FIG. 1, illustrating entry of a word using the navigation key-based predictive text entry method illustrated in FIG. 3.

Referring now to FIGS. 3 though 9, entry of an exemplary text string 112 using the navigation key-based predictive text entry method of FIG. 2 is described. For purposes of illustration, the English word "access" is entered using characters comprising letters of the English alphabet. However, it will be appreciated that other English words, words of other languages, logographic symbols, and the like, may be entered using the method described. In the specific embodiment illustrated, the method employs a prediction engine, in this case a letter prediction engine (LPE), employing a dictionary 300 containing the one hundred ninety-eight words illustrated in FIG. 11.

As shown in FIG. 3, a table 116 having an initial arrangement of letters 108 is displayed by the display 104 for entering a letter in the first character position 110 of a word in a text string 112. In exemplary embodiments, the letter prediction engine determines the probability of selection of each letter 108 of the alphabet and arranges the letters of the table 116 according to their probability selection for entry in the first character position. As shown, the letter "a" is determined to have the highest probability of selection for the first character position 110 and is positioned as the default character 118 for entry via a single input from the navigation key assembly 106. Accordingly, the letter "a" is centered in the letter table and marked or highlighted for selection via a single input from the navigation key assembly (e.g., a single press of the center of the five-way navigation key. Letters other than the letter with the highest probability of selection (i.e., the letters "c", "p", "s", "i", etc.) are positioned according to the probability of selection of the letter so that letters with a higher probability of selection are positioned closer to the letter "a" and letters having a lower probability of selection farther away from the letter "a". The letters having the second, third, fourth and fifth highest probability of selection (e.g., the letters "c", "p", "s" and "i") are positioned adjacent to the letter "a". Alternatively, letters for selection in the initial character position of the word may be displayed in alphabetical order, in QWERTY keyboard order, or the like, so that the user may more easily find the desired character. The user selects the letter "a" for entry by depressing the center 124 of the five-way navigation key 114, whereupon the letter "a" is entered into the first character position 110 of the text string 112. This action requires one keystroke.

Figure 4:
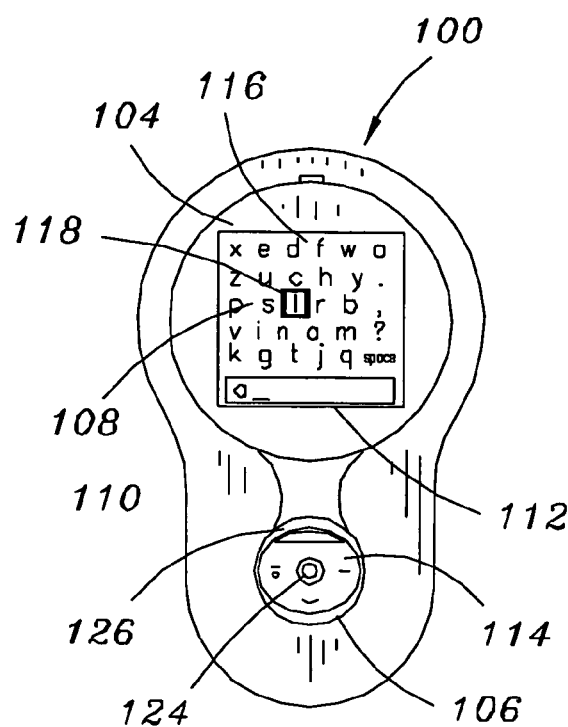
Figure 5:
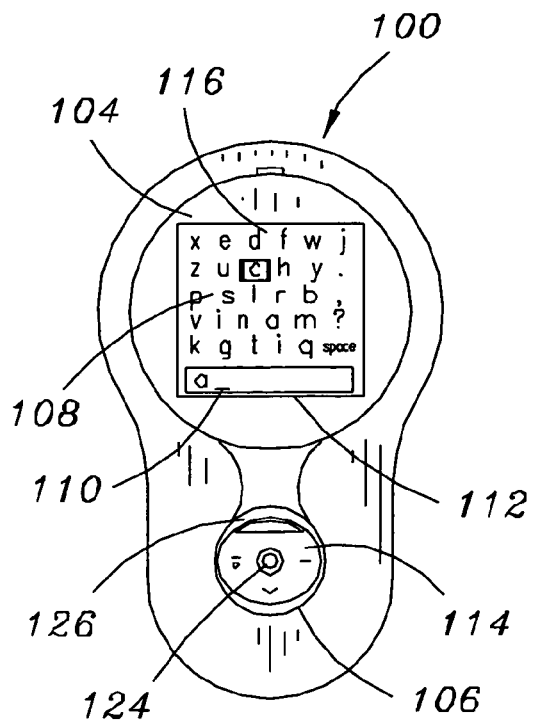

As shown in FIGS. 4 and 5, the letter prediction engine then determines the probability of selection of each letter 108 of the alphabet for entry in the second character position. Again, the letter prediction engine arranges the letters of the table according to the probability of their selection for entry in the second character position. In the specific example illustrated, the letter "l" is determined to have the highest probability of selection for the second character position, and is positioned as the default selection. Accordingly, the letter "l" is centered in the table and marked or highlighted for selection via a single input from the navigation key assembly 106 (e.g., a single press of the center 124 of the five-way navigation key 114), while letters other than the letter with the highest probability of selection are again positioned according to the probability of selection of the letter. Thus, the letters having the second, third, fourth and fifth highest probability of selection (e.g., the letters "r", "c", "s" and "n") are positioned adjacent to the letter "l". However, the letter "l" is not the desired letter. Thus, as shown in FIG. 5, the user manipulates the navigation key assembly 106 to navigate or scroll to the desired letter "c" by depressing the upper portion 126 of the five-way navigation key 114). The user next selects the letter "c" for entry by depressing the center portion 124 of the five-way navigation key 114, whereupon the letter "c" is entered into the second character position 110 of the text string 112. Selection of the letter "c" thus requires two additional keystrokes.

Figure 6:
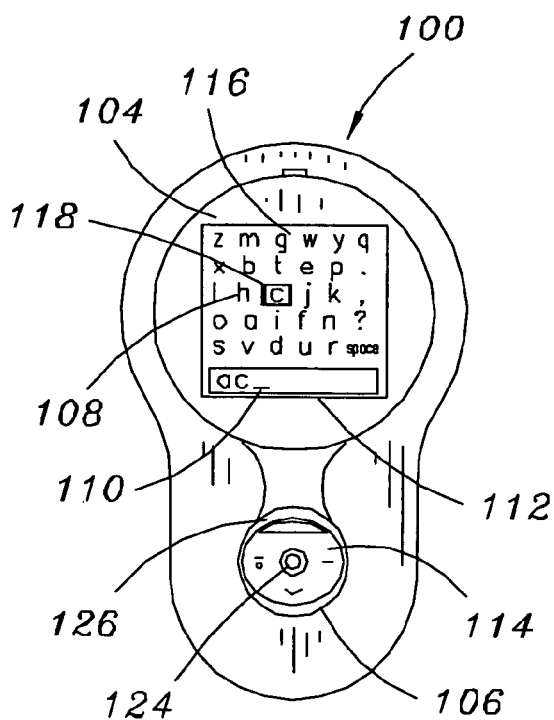

As shown in FIG. 6, the letter prediction engine next determines the probability of selection of each letter 108 of the alphabet for entry in the third character position and arranges the letters of the table according to the probability of their selection. For the third character position, the letter "c" is determined to have the highest probability of selection, and is positioned as the default selection (e.g., centered in the table), and marked or highlighted for selection via a single input from the navigation key assembly 106 (e.g., a single press of the center portion 124 of the five-way navigation key 114). Again, letters other than the letter with the highest probability of selection are again positioned according to the probability of selection of the letter, so that the letters having the second, third, fourth and fifth highest probability of selection (e.g., the letters "j", "t", "h" and "i") are positioned adjacent to the letter "c". The user selects the letter "c" for entry by depressing the center portion 124 of the five-way navigation key 114, whereupon the letter "c" is entered into the third character position 110 of the text string 112. This action requires one additional keystroke.

Figure 7:
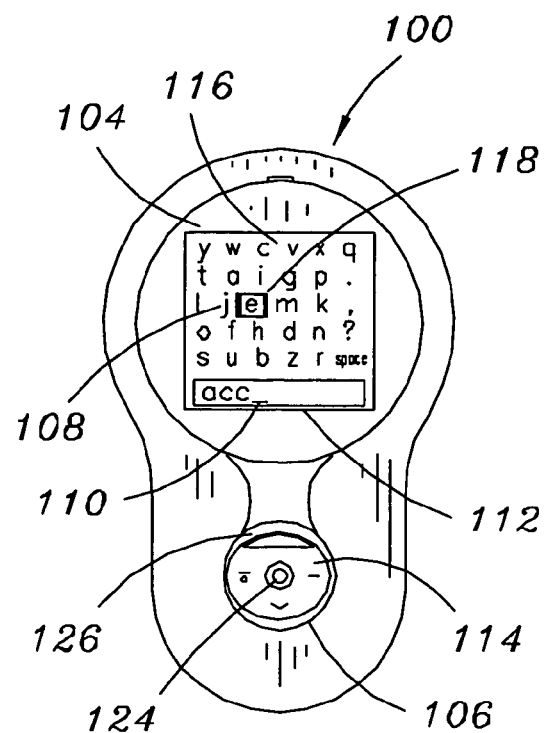
Figure 8:
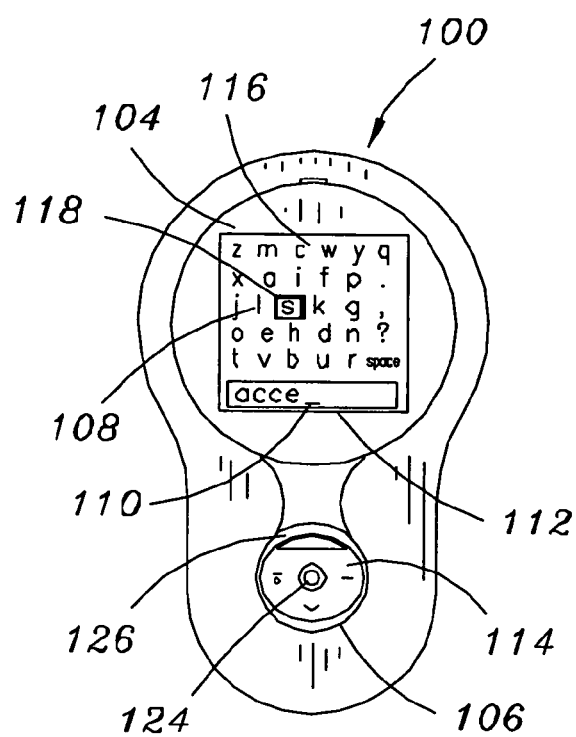
Figure 9:
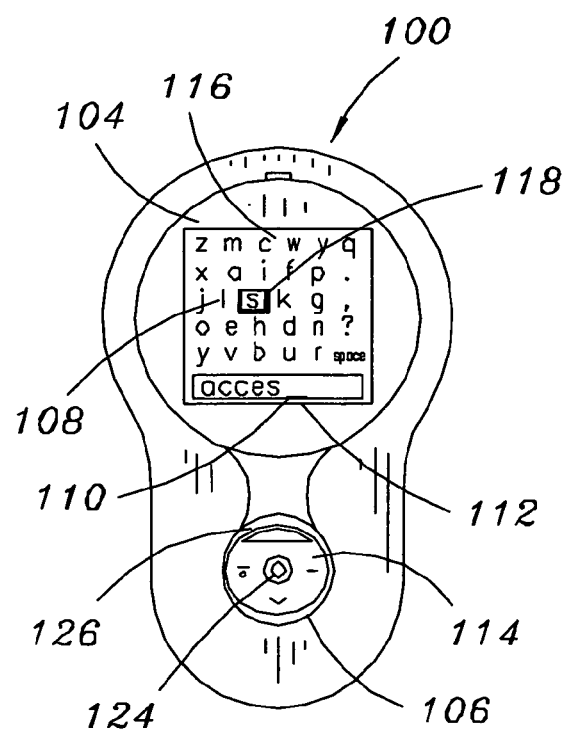

As shown in FIGS. 7, 8 and 9, the letters "e", "s" and "s" are entered in the same fashion as the letters "a", "c" and "c". The letter prediction engine determines the probability of selection of each letter 108 of the alphabet for entry in the fourth, fifth and sixth character positions in turn, each time arranging the letters of the table according to the probability of their selection. For the fourth, fifth and sixth character positions, the letters "e", "s" and "s" are respectively determined to have the highest probability of selection, and are positioned as the default selection (e.g., centered in the table), and marked or highlighted for selection via a single input from the navigation key assembly 106 (e.g., a single press of the center portion 124 of the five-way navigation key 114). Thus, the user selects the letters for entry by depressing the center portion 124 of the five-way navigation key 114 selecting each letter "e", "s" and "s" in turn, whereupon the letters are entered into the respective character positions 110 of the text string 112. Entry of the letters "e", "s" and "s" thus requires three additional keystrokes.

Figure 10:
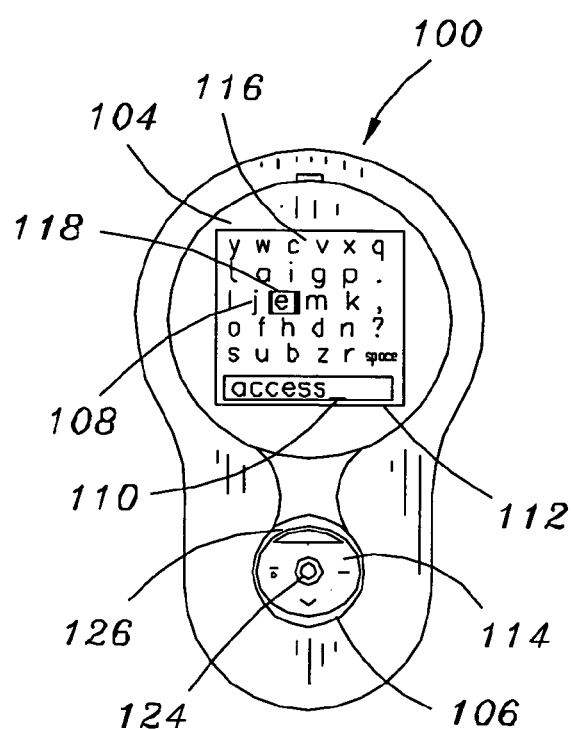

As shown in FIG. 10, the letter prediction engine next determines the probability of selection of each letter 108 of the alphabet for entry in the seventh character position and arranges the letters of the table according to the probability of their selection. For the seventh character position, the letter "e" is determined to have the highest probability of selection, and is made the default selection. However, the letter "e" is not the desired letter. Thus, as shown in FIG. 10, the user manipulates the navigation key assembly 106 to navigate or scroll to the space, or alternatively, a punctuation symbol, and select the space or punctuation symbol for entry, completing entry of the word "access". Alternatively, the space or a punctuation symbol may be selected as the character with the highest probability of entry, eliminating the need to scroll though the displayed characters for their selection. Thus, utilizing navigation key-based predictive text entry in accordance with the present invention, entry of the word "access" requires only seven keystrokes. For comparison, entry of the word "access" would require at least seventeen keystrokes using only a navigation key and a fixed letter table wherein the probability of selection of letters for entry is not considered, seventeen keystrokes using a conventional twelve-key alphanumeric keypad without T9 input, and six keystrokes using a twelve-key alphanumeric keypad with T9 input.

Referring to FIGS. 12 through 22, exemplary schemes or methods used by prediction engines in accordance with the present invention for determining the probability of selection of a character for entry in a specific character position of a text string are described. The prediction engine calculates the probability selection of characters for entry based on a predefined dictionary of character strings or words. This dictionary may be stored in the memory of the hand-held communication device, allowing the user to add words to the dictionary as necessary, stored in a remote location and accessed via a communication network, or the like. In embodiments of the invention, the addition of new words to the dictionary may be accomplished automatically (without user intervention) as the words are entered in text strings being composed. Alternatively, the user may manually enter words into the dictionary. In other embodiments, the dictionary may be used only to generate probabilities of selection for characters in various character positions of a text string and not stored. For purposes of illustration, the various schemes or methods used by the prediction engine will be described using letters of the English alphabet. However, it is to be understood that the present invention is not limited to the particular embodiment illustrated, but may employ letters and characters from other languages including languages employing logographic symbols and the like.

Position-Based Context

Figure 12:
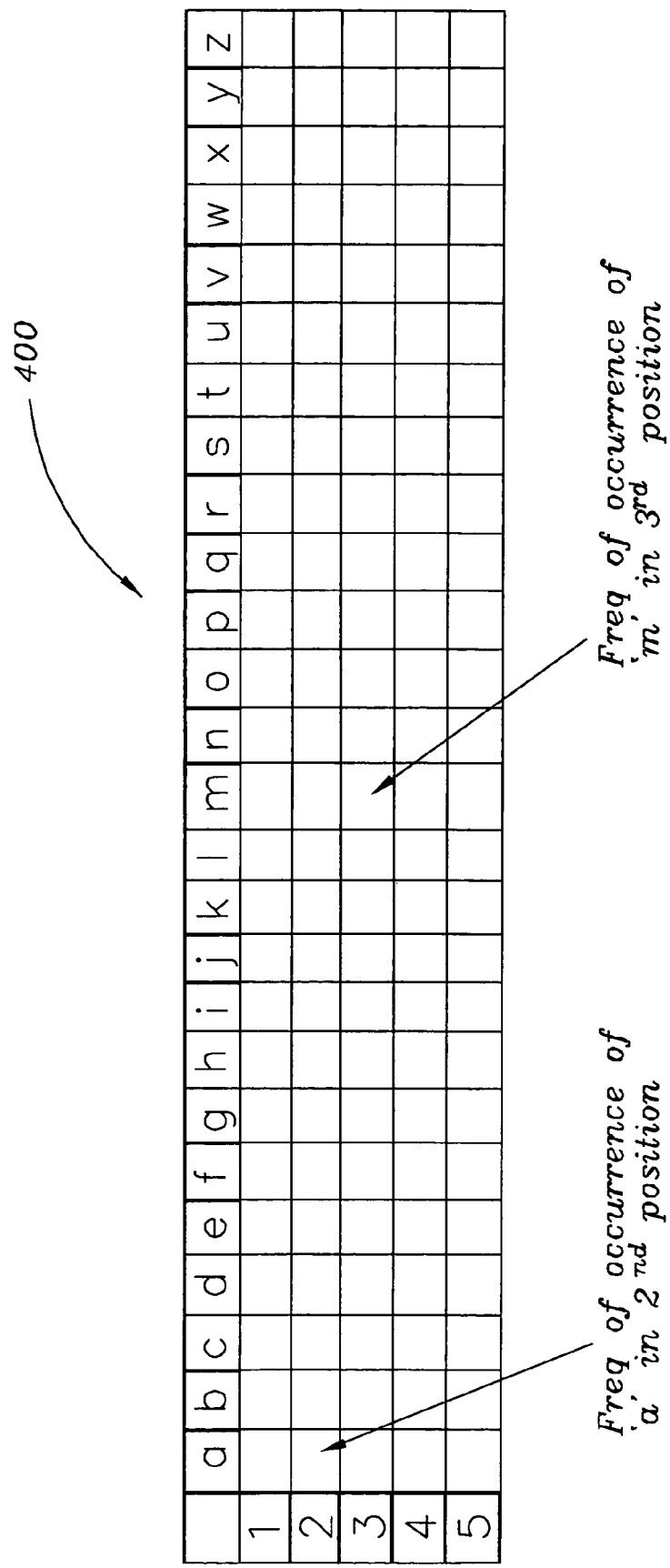
FIG. 12 is a diagrammatic illustration depicting an exemplary probability table, specifically a letter probability table (LPT) for a dictionary having a maximum word length ("N") of 5 letters, for use by a prediction engine employing a position-based context scheme for determining the probability of selection of characters for a character position of a word in a text string.

Referring to FIG. 12, a position based context scheme for calculating the probability of selection of a letter for entry in a character position of a word is described. Using this scheme, the length or size of the largest word in the dictionary of words is assumed to be a maximum number of letters ("N"), such that there is no word in the dictionary that is greater in length than "N" letters. Thus, if the word being entered by the user is longer than "N" letters in length, the letter prediction engine predicts the probabilities for the first "N" character positions of the word. The letter prediction engine calculates the probabilities by querying a probability table such as the letter probability table (LPT) 400 illustrated in FIG. 12. Using the words in the dictionary, the frequency of occurrence of each letter in a given character position within a word (i.e., the number of words in the dictionary with the letter in a given character position) is calculated for each of the "N" character positions and stored in a respective cell of the letter probability table. In one embodiment, the letter probability table may be regenerated each time text entry is initiated. In such embodiments, the dictionary is stored in memory within the hand-held communication device. Storage of the dictionary increases the memory requirements of the hand-held communication device, but allows the user to add custom words to the dictionary during use of the device. However, the probability of selection of a letter has no dependency on any of the letters of that word that have been previously entered. Thus, in other embodiments, the letter probability table may be pre-generated and stored in memory of the hand-held communication device. In such embodiments, the dictionary need not be stored in memory of the hand-held communication device. By not storing the dictionary, the amount of memory required by the letter prediction engine is greatly reduced. Moreover, the speed of the letter prediction engine is increased since the letter prediction engine does not have to recalculate the probabilities of selection to regenerate the letter probability table.

It should be noted that the size requirement for a letter probability table is independent of the size of the reference dictionary employed. Instead, the size of the table depends only on the maximum word size and the number of letters in the alphabet used. For a pre-generated letter probability table, the number of required entries in the table and thus the amount of memory required by the table is determined by the relation:

$$M = N \cdot A$$

where "M" is the number of required entries of the letter probability table and "A" is the number of letters in the alphabet, characters in the language, or the like. Thus, using the English alphabet, the number of required entries ("M") of a letter probability table for a dictionary having a maximum word length "N" of 5 letters is 130 entries, while the number of required entries ("M") of a letter probability table for a dictionary having a maximum word length "N" of 10 letters is 260 entries. Consequently, the memory requirements for storing a letter probability table are substantially less than the memory requirements of the databases employed for conventional T9 text entry.

The letter prediction engine may alternatively employ a prefix based context scheme for calculating the probability of a letter being entered using navigation key-based text entry. Using this scheme, words of text strings composed by a user are divided into two portions: a head portion or HEAD and a tail portion or TAIL. The HEAD comprises the letters of the word that have been entered. The TAIL includes the letters of the word that are yet to be entered. Thus, as the word is entered by the user, the HEAD increases in length and the TAIL decreases in length. Unlike, the position based context scheme discussed with reference to FIG. 12, the prefix based context scheme uses the HEAD as a context for calculating the relative probabilities of selection for letters in the next character position (i.e., the first character position of the TAIL). Thus, to calculate the probability of selection of a letter, the letter prediction engine accesses or queries the dictionary for words having an identical HEAD as the word being entered. The set of words in the dictionary having the same HEAD as the word being entered constitutes a CANDIDATE SET of words from which the probabilities of selection of letters for the next character position are calculated.

Initially, when the user is yet to enter the first letter of the word, the HEAD is blank and the CANDIDATE SET comprises all the words in the dictionary. The letter prediction engine queries the dictionary, and, using all of the words in dictionary, generates for each letter of the alphabet a frequency of occurrence of that letter in the initial or first character position of a word (i.e., the letter prediction engine determines how many words in the dictionary start with each letter of the alphabet). Letters of the alphabet are then assigned a probability of selection corresponding to their frequency of occurrence in the dictionary. For example, in embodiments of the invention, a letter probability table may be generated for the character space being entered. Letters with the highest frequency of occurrence are assigned the highest probability of selection and the letters with the lowest frequency of occurrence are assigned the lowest probability of selection. Each time the user selects a letter for entry in the word, the letter selected is added to the HEAD. The CANDIDATE SET is then regenerated based on the new HEAD so that the CANDIDATE SET contains only those words that have the same HEAD as the word being entered. The letter prediction engine, using only the words in CANDIDATE SET, generates for each letter of the alphabet a frequency of occurrence of that letter in the next character position of a word. Letters of the alphabet are then assigned a probability of selection corresponding to their frequency of occurrence in the CANDIDATE SET. The word is deemed to be completed when the user selects a non-letter terminator such as a space or a punctuation symbol (e.g., a period, a comma, a question mark, or the like). When entry of the word is completed, the HEAD is reset to null and the CANDIDATE SET is regenerated so that it comprises all the words in the dictionary.

Prefix-Based Context

Referring now to FIGS. 13 though 20, entry of a word, specifically the word "bar" using navigation key-based text entry employing a prefix-based context scheme in accordance with the present invention is described. In the example illustrated, a dictionary including the words about, access, bad, bar, bartender, barter, ban, bear, beer, binary, bite, boat, car, cartoon, cartoonist, desk, dog, ear, earn, eat, fan, far, goat, hat, he, hen, her, here, hear, heat, image, jack, late, mark, market, mask, money, near, neat, open and queue is used. At the beginning of a word being entered, the HEAD is set to null and the CANDIDATE SET includes all of the words in the dictionary. Thus, the CANDIDATE SET includes the words about, access, bad, bar, bartender, barter, ban, bear, beer, binary, bite, boat, car, cartoon, cartoonist, desk, dog, ear, earn, eat, fan, far, goat, hat, he, hen, her, here, hear, heat, image, jack, late, mark, market, mask, money, near, neat, open and queue.

Using the CANDIDATE SET, the letter prediction engine generates for each letter the frequency of occurrence of the letter in the first position of a word. As shown in the letter occurrence count table 500 of FIG. 13, the letter "b" has the highest frequency of occurrence in the first character position of a word based on the words in the dictionary, followed by the letters "h", "m", "c" and "e" (in order of decreasing frequency of occurrence). The letter prediction engine thus causes the letters 108 to be arranged in a table 116 as shown in FIG. 14. The letter "b", which has the highest probability of selection, is centered in the table 116 and highlighted or marked as the default entry so that a user can select the letter "b" with a single keystroke (i.e., by pressing a key of the navigation key assembly once). Selection of the letters "h", "m", "c" or "e" requires two keystrokes; one keystroke for navigating to and highlighting the desired letter, and a second keystroke for selecting the letter for entry in the character position. Selection of letters having lower probabilities of selection require three or more keystrokes (assuming the navigation key assembly used allows the user to scroll up, down, left and right with a single keystroke).

In the example shown, the user selects the letter "b" as the initial letter of the word being entered. The letter "b" is added to the HEAD, and the CANDIDATE SET is regenerated for selection of a letter for the second character position of the word. The CANDIDATE SET is regenerated to include only those words in the dictionary that have the letter "b" in the first character position (i.e., only those letters that begin with the letter "b"). Thus, for the present dictionary, the CANDIDATE SET is reduced to bad, bar, bartender, barter, ban, bear, beer, binary, bite and boat.

Using the regenerated CANDIDATE SET, the letter prediction engine generates for each letter the frequency of occurrence of the letter in the second position of a word. As shown in FIG. 15, the letter "a" has the highest frequency of occurrence in the second character position of a word based on the words in the CANDIDATE SET, followed by the letters "e," "i" and "o" (in order of decreasing frequency of occurrence). The letter prediction engine causes the letters to be arranged in the table 116 as shown in FIG. 16. As with the letter "b", the letter "a", which has the highest probability of selection, is centered in the table and highlighted or marked as the default entry so that a user can select the letter "a" with a single keystroke. Selection of the letters "e", "i", "o", or "d" requires two keystrokes, while selection of other letters requires three or more keystrokes.

The user selects the letter "a" as the second character of the word being entered. The letter "a" is added to the HEAD so that the HEAD includes the letters "ba," and the CANDIDATE SET is regenerated for selection of a letter for the third character position of the word. The CANDIDATE SET is regenerated to include only those words in the dictionary that have the letter "ba" in the first and second character positions (i.e., only those letters that begin with the letters "ba"). Thus, for the present dictionary, the CANDIDATE SET is further reduced to bad, bar, bartender, barter and ban.

Using the regenerated CANDIDATE SET, the letter prediction engine again generates the frequency of occurrence of each letter in the third position of a word. As shown in FIG. 17, the letter "r" has the highest frequency of occurrence in the third character position of a word based on the words in the CANDIDATE SET, followed by the letters "d" and "n." The letter prediction engine causes the letters to be arranged in the table, as shown in FIG. 18, so that the letter "r", which has the highest probability of selection, is centered in the table and highlighted or marked as the default allowing entry of the letter "r" with a single keystroke. Selection of the letters "d," "n," "c," or "j" requires two keystrokes, while selection of other letters requires three or more keystrokes.

The user selects the letter "r" as the third character of the word being entered. The letter "r" is added to the HEAD so that the HEAD includes the letters "bar," and the CANDIDATE SET is regenerated for selection of a letter for the fourth character position of the word. The CANDIDATE SET is regenerated to include only those words in the dictionary that have the letters "bar" in the first, second and third character positions (i.e., only those letters that begin with the letters "bar"). Thus, for the present dictionary, the CANDIDATE SET is reduced to bar, bartender and barter.

Using the regenerated CANDIDATE SET, the letter prediction engine again generates the frequency of occurrence of each letter in the third position of a word. As shown in FIG. 19, the letter "t" has the highest frequency of occurrence in the third character position of a word based on the words in the CANDIDATE SET. The letter prediction engine causes the letters to be arranged in the table, as shown in FIG. 18, so that the letter "t", which has the highest probability of selection, is centered in the table and highlighted or marked as the default allowing entry of the letter "t" with a single keystroke. Selection of other letters requires two or more keystrokes.

The user now selects one of a space or a punctuation symbol (e.g., a comma, a period, a question mark, an exclamation point, or the like) by scrolling or navigating to and entering the desired space or symbol using the navigation key assembly. The letter prediction engine now determines that a new word is to be entered and resets the HEAD to null so that the CADIDATE SET again includes all of the words in the dictionary, specifically the words about, access, bad, bar, bartender, barter, ban, bear, beer, binary, bite, boat, car, cartoon, cartoonist, desk, dog, ear, earn, eat, fan, far, goat, hat, he, hen, her, here, hear, heat, image, jack, late, mark, market, mask, money, near, neat, open and queue.

Assuming the dictionary is not changed, the letter prediction engine again generates the frequency of occurrence of each letter in the first position of the new word. Because the HEAD is again null and the CANDIDATE SET include all words in the dictionary, the letter "b" is again determined to have the highest frequency of occurrence, followed by the letters "h," "m," "c" and "e" as shown in FIG. 13. Accordingly, the letter prediction engine again causes the letters to be arranged in the table as shown in FIG. 14, so that the letter "b" is the default entry.

Figure 21:
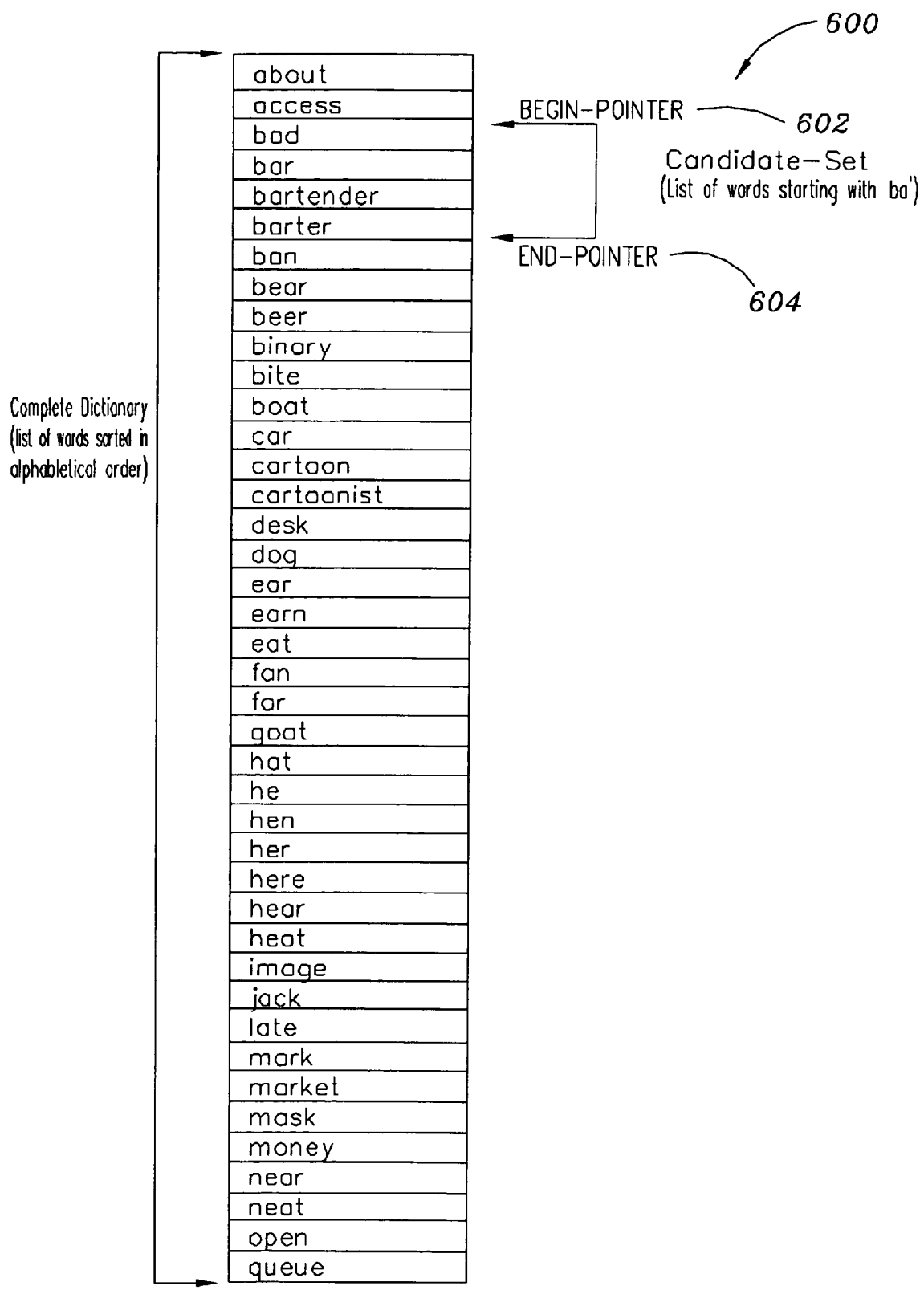
FIG. 21 is a diagrammatic illustration depicting a dictionary of words employing pointers for marking the beginning and end of a candidate set of words within the dictionary for use by a prediction engine employing a prefix-based context scheme with full dictionary searching for determining the probability of selection of characters for a character position of a word of a text string being composed.

In one embodiment of the prefix-based context scheme, the dictionary may be stored in memory by the hand-held communication device allowing the prefix based context scheme to be implemented via a full search of the dictionary. In this embodiment, the dictionary 600 is maintained as a list of words sorted in alphabetical order as shown in FIG. 21. Thus, the CANDIDATE SET comprises a contiguous subset or group of words in the list, allowing the CANDIDATE SET to be realized by maintaining a set of pointers that mark the beginning and end of the CANDIDATE SET within the list. For example, as shown in FIG. 21, a beginning pointer ("BEGIN-POINTER" 602) is maintained to point to the first word in the CANDIDATE SET within the list, while an ending pointer ("END-POINTER" 604) is maintained to point to the last word in the CANDIDATE SET so that all words included in the list between the beginning and ending pointers are within the CANDIDATE SET. Each time a letter is entered into a character space, the letter prediction engine queries the words in the CANDIDATE SET and generates for each letter of alphabet the frequency of occurrence of that letter in the next position. Thus in this embodiment, each entry in the letter probability table comprises a letter associated with the frequency or count of words that contain the letter in the desired character position. In typical embodiments, the dictionary is stored in memory within the hand-held communication device. Storage of the dictionary increases the memory requirements of the hand-held communication device, but allows the user to add custom words to the dictionary during use of the device. Added words are inserted in the list at appropriate place to maintain the sorting order, or the list is re-sorted after addition of the added word (e.g., so that words in the list are maintained in alphabetical order).

Figure 22:
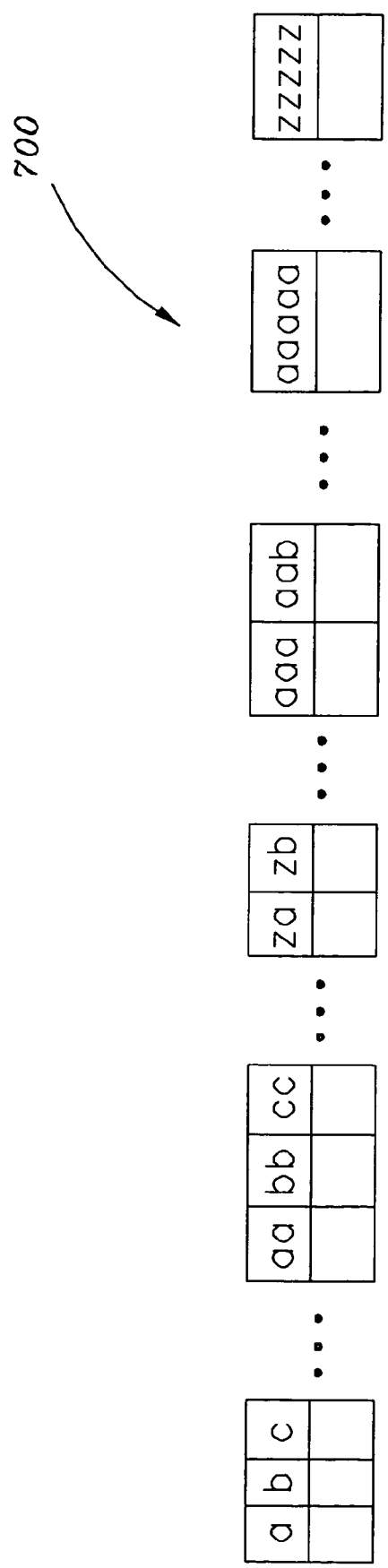
FIG. 22 is a diagrammatic illustration depicting an exemplary prefix count table (PCT) for a dictionary having a maximum word length ("N"), for use by a prediction engine employing a prefix-based context scheme for determining the probability of selection of characters for a character position of a word in a text string being composed.

In other embodiments of the scheme, a pre-generated prefix count table (PCT) containing the probabilities of selection of letters for character positions within words being entered is stored in the memory of the mobile device instead of the entire dictionary. As shown in FIG. 22, the prefix count table cross-references prefix strings comprised of a candidate letter for the character position of words being entered and the corresponding HEAD of the word preceding the character position with a number corresponding to a probability of selection of the candidate letter. Thus, in the embodiment illustrated, each entry in the prefix count table comprises a prefix-string correlated with the frequency of occurrence of words in the dictionary that begin with the prefix-string. Preferably, the prefix count table includes all permutations or combinations of letters up to a maximum number of letters ("N") equal to the maximum length of words in the dictionary of words (i.e., the length of the longest word in the dictionary). Accordingly, in this embodiment, the length or size of the largest word in the dictionary of words is again assumed to be a maximum number of letters ("N"), such that there is no word in the dictionary that is greater in length than "N" letters.

The letter prediction engine determines the probability of selection of a letter for entry in a particular character position by querying the prefix count table for the frequency of occurrence of all prefix strings having a HEAD identical to the HEAD of the word being entered. For example, when the user has entered the letters "ba," such that "ba" is the HEAD of the word being entered, the letter prediction engine queries the prefix count table for the frequency of occurrence of all prefix strings having a HEAD consisting of the letters "ba" (i.e., the prefix strings "baa" through "baz"). The frequencies of occurrence obtained are used as the frequency of occurrence of the letters "a" though "z," respectively, in the next character position.

The prefix count table may be created by searching the reference dictionary for each prefix string and determining the number of words in the dictionary that start with each prefix string to generate the frequency count for the prefix string. The frequency count is then associated with the prefix string in the prefix count table.

The size requirement for a prefix count table depends only on the maximum word size and the number of letters in the alphabet used. For a pre-generated prefix count table (LPT), the number of required entries in the table and thus the amount of memory required by the table is determined by the relationship:

$$M = \Sigma_1^N A^N$$

where "M" is the number of required entries of the prefix count table and "A" is the number of letters in the alphabet, characters in the language, or the like. Thus, using the English alphabet, the number of required entries ("M") of a letter probability table for a dictionary having a maximum word length "N" of 1 letter is 26 entries, while the number of required entries ("M") of a letter probability table for a dictionary having a maximum word length "N" of 2 letters is 720 entries, and number of required entries ("M") of a letter probability table for a dictionary having a maximum word length "N" of 3 letters is 18,278 entries.

In yet other embodiments, the letter prediction engine may employ a prefix based context scheme with partial prefix index table (PIT) 700 searching and an active dictionary for calculating the probability of a letter being entered using navigation key-based text entry. This embodiment employs a prefix index table (PIT), which is similar to prefix count table (PCT). However, in addition to correlating prefix-strings with the frequency of occurrence of words in the dictionary that begin with the prefix-string, the prefix index table also provides one or more pointers for each entry of the table, to a specific position or positions within the dictionary, which is maintained as a list of words sorted in alphabetical order much like the dictionary shown in FIG. 21. The prefix index table can thus be used to quickly jump, via the pointers, to the position in the dictionary where the prefix-related words are stored. In this manner, searching of large dictionaries may be accomplished in a shorter time.

The prefix index table uses a small maximum word size ("N"), which is selected based on desired memory and searching speed requirements, and need not necessarily be related to the size of words in the dictionary. In this manner, the number of entries and thus the amount of memory required by the prefix index table is kept small in comparison with the prefix count table. For first "N" characters of a word, only the prefix index table need be searched instead of searching the entire dictionary. Thus, for the first "N" characters or letters of a word being entered, the prefix index table functions as a prefix count table. The dictionary is not used. For character positions greater than the Nth character position, the prefix index table entry provides one or more pointers to specific locations in the dictionary. For example, the prefix index table pointers may be used to define a CANDIDATE SET comprising a contiguous subset or group of words in the dictionary list. In one embodiment, the prefix index table, based on the prefix string of "N" characters, may provide an initial beginning pointer ("BEGIN-POINTER") to point to the first word in the CANDIDATE SET within the list, and an initial ending pointer ("END-POINTER") to point to the last word in the CANDIDATE SET so that all words included in the list between the beginning and ending pointers are within the CANDIDATE SET defined by the prefix string. Thereafter, each time a letter is entered into a character space, the letter prediction engine queries the words in the CANDIDATE SET and generates for each letter of alphabet the frequency of occurrence of that letter in the next position. Thus in this embodiment, each entry in the letter probability table comprises a letter associated with the frequency or count of words that contain the letter in the desired character position. In typical embodiments, both the prefix index table and the dictionary are stored in memory within the hand-held communication device. Storage of the dictionary increases the memory requirements of the hand-held communication device, but allows the user to add custom words to the dictionary during use of the device. Any added word is inserted in the list at an appropriate place to maintain the sorting order, or the list is re-sorted after addition of the added word (e.g., so that words in the list are maintained in alphabetical order).

As used herein, the term "probability of selection" refers to any measure of the likelihood of selection of a character for entry in a character position, including but not limited to a probability expressed as a percentage, a frequency of occurrence of the character, an assigned rank based on frequency of occurrence or probability, or the like. Thus, the term "probability of selection" should not be construed as being limited to any one measure. Additionally, it will be appreciated that two or more characters or letters may have a probability of selection that are equal to one another, or equal to zero. In such instances, the prediction engine of the present invention may use secondary considerations to arrange the characters on the display. For example, characters having identical probabilities of selection may be arranged in alphabetical order, a user defined order, a random order, or the like.

In exemplary embodiments, the methods disclosed herein may be implemented as one or more sets or programs of instructions such as software or firmware resident in memory of a hand-held communication device such as the hand-held communication device 100 described in the discussion of FIG. 1. Until required by the hand-held communication device, the set of instructions may be stored in another readable memory device, for example in a data card (e.g., SIM card, a UIM card, or the like) readable by a data card reader). Further, the program of instructions may be transmitted to the hand-held communication device via the communication network, the Internet, an Intranet, or the like, when required for text entry. Additionally, the instructions may be transmitted over a network in the form of an applet that is interpreted or compiled after transmission to the information appliance rather than prior to transmission. One skilled in the art would appreciate that the physical storage of the sets of instructions or applets physically changes the medium upon which it is stored electrically, magnetically, chemically, physically or optically so that the medium carries computer readable information.

It is understood that the specific order or hierarchies of steps in the methods disclosed are examples of exemplary approaches. Based upon design preferences, it is understood that the specific order or hierarchy of steps in the method can be rearranged while remaining within the scope of the present invention. The attached method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A hand-held communication device, comprising:
a housing generally sized to be held in a human hand;
a display disposed in the housing for displaying characters selectable for entry in a character position of a text string being entered;
a processor for executing a prediction engine to determine the probability of entry for the next character to be entered based on prior entered characters; and
a navigation key assembly disposed in the housing for entering a highlighted character with a single input or for highlighting a different character wherein the character are arranged such that the character with the highest probability of entry, as determined by the processor, is initially highlighted and the other characters are arranged near the initially highlighted character, wherein the distance from the initially highlighted character is based on the probability of entry as determined by the prediction engine.

2. The hand-held communication device as claimed in claim 1, wherein the characters are displayed in a list, the character with the highest probability of selection being indicated as the highlighted character within the list for selection via a single input to the navigation key assembly.

3. The hand-held communication device as claimed in claim 2, wherein characters other than the character with the highest probability of selection are arranged in the list according to the probability of selection of each character, the character with the second highest probability of selection being positioned adjacent to the character with the highest probability of selection and the character with the lowest probability of selection being positioned farthest from the character with the highest probability of selection.

4. The hand-held communication device as claimed in claim 3, wherein the character with the third highest probability of selection is positioned adjacent to the character with the highest probability of selection.

5. The hand-held communication device as claimed in claim 1, wherein displaying characters for entry in a character position comprises displaying the characters in a table, the character with the highest probability of selection being indicated as a default character within the table for selection via a single input from the navigation key assembly.

6. The hand-held communication device as claimed in claim 5, wherein characters other than the character with the highest probability of selection are arranged in the table according to the probability of selection of each character, the character with the second highest probability of selection being positioned adjacent to the character with the highest probability of selection and the character with the lowest probability of selection being positioned farthest from the character with the highest probability of selection.

7. The hand-held communication device as claimed in claim 6, wherein at least the characters with the third, fourth and fifth highest probabilities of selection are positioned adjacent to the character with the highest probability of selection.

8. The hand-held communication device as claimed in claim 1, wherein the prediction engine retrieves the probability of selection of each character from a probability table providing the probability of occurrence of each character within the character position.

9. The hand-held communication device as claimed in claim 8, wherein the characters comprise letters and the probability table comprises a letter probability table, the letter probability table being generated by accessing a dictionary including a plurality words, determining the probability of occurrence of each letter in the character position based on the number of occurrences of the letter in the character position of the words contained in the dictionary and storing the determined probability of occurrence of each letter in the character position in the letter probability table.

10. The hand-held communication device as claimed in claim 1, wherein the characters comprise letters and the text string includes a head containing at least one letter already entered and a tail containing the character position, and wherein the prediction engine determines the probability of selection letters for entry in the character position based on letters entered in head.

11. The hand-held communication device as claimed in claim 1, wherein the prediction engine determines the probability of selection letters for entry in the character position by accessing a dictionary including a plurality words, determining the probability of occurrence of each letter in the character position based on the number of occurrences of the letter in the character position of the tails of words contained in the dictionary which have a head matching the head entered.

12. The hand-held communication device as claimed in claim 11, wherein the prediction engine accesses the dictionary using at least one pointer to mark the beginning and ending of a candidate set of words within the dictionary, the words in the dictionary being sorted in alphabetical order.

13. The hand-held communication device as claimed in claim 11, wherein the prediction engine retrieves the probability of selection of letters for entry in the character position from a prefix count table, the prefix count table containing the probability of a letter being selected based on the head entered.

14. A method for entering a text string using a navigation key assembly of a hand-held communication device, comprising:
using a prediction engine to determine the probability of selection of the next character to be entered, within a text string, based on previously entered characters;
displaying characters for entry wherein the character with the highest probability is highlighted and the other characters are arranged near the highlighted character according to the probability of selection as determined by the prediction engine;
receiving a single input from the navigation key assembly to enter the highlighted character or receiving a second input from the navigation key assembly to scroll to a different character and to highlight the character for entry; and
repeating the above steps if there are remaining characters to be entered.

15. The method as claimed in claim 14, wherein determining the probability of selection of each character comprises retrieving the probability of selection of each character from a probability table providing the probability of occurrence of each character within the character position.

16. The method as claimed in claim 15, wherein the characters comprise letters and the probability table comprises a letter probability table, the letter probability table being generated by accessing a dictionary including a plurality words, determining the probability of occurrence of each letter in the character position based on the number of occurrences of the letter in the character position of the words contained in the dictionary and storing the determined probability of occurrence of each letter in the character position in the letter probability table.

17. The method as claimed in claim 14, wherein the characters comprise letters and the text string includes a head containing at least one letter already entered and a tail containing the character position, and wherein determining the probability of selection of characters for entry in the character position comprises determining the probability of selection letters for entry in the character position based on letters entered in head.

18. The method as claimed in claim 17, wherein determining the probability of selection letters for entry in the character position comprises accessing a dictionary including a plurality words, determining the probability of occurrence of each letter in the character position based on the number of occurrences of the letter in the character position of the tails of words contained in the dictionary which have a head matching the head entered.

19. The method as claimed in claim 18, wherein the step of accessing the dictionary comprises using at least one pointer to mark the beginning and ending of a candidate set of words within the dictionary, the words in the dictionary being sorted in alphabetical order.

20. The method as claimed in claim 14, wherein the characters comprise letters and the text string includes a head containing at least one letter already entered and a tail containing the character position, and
wherein determining the probability of selection comprises retrieving the probability of selection of letters for entry in the character position from a prefix count table, the prefix count table containing the probability of a letter being selected based on the head entered.

21. The method as claimed in claim 14, wherein displaying characters for entry in a character position comprises displaying the characters in a list.

22. The method as claimed in claim 21, wherein characters other than the character with the highest probability of selection are arranged in the list according to the probability of selection of each character, the character with the second highest probability of selection being positioned adjacent to the character with the highest probability of selection and the character with the lowest probability of selection being positioned farthest from the character with the highest probability of selection.

23. The method as claimed in claim 22, wherein the character with the third highest probability of selection is positioned adjacent to the character with the highest probability of selection.

24. The method as claimed in claim 14, wherein displaying characters for entry in a character position comprises displaying the characters in a table, the character with the highest probability of selection being highlighted within the table.

25. The method as claimed in claim 24, wherein characters other than the character with the highest probability of selection are arranged in the table according to the probability of selection of each character, the character with the second highest probability of selection being positioned adjacent to the character with the highest probability of selection and the character with the lowest probability of selection being positioned farthest from the character with the highest probability of selection.

26. The method as claimed in claim 24, wherein at least the characters with the third, fourth and fifth highest probabilities of selection is positioned adjacent to the character with the highest probability of selection.

27. A hand-held communication device, comprising:
means for predicting to determine the probability of selection of a next character to be entered, within a text string, based on previously entered characters;
means for displaying characters for entry in a character position of the text string on the communication device wherein the character with the highest probability is highlighted and the other characters are arranged near the highlighted character according to the probability of selection as determined by a prediction engine;
means for receiving a single input from a navigation key assembly to enter the currently highlighted character as the next character or for receiving inputs from the navigation key assembly to scroll to a different character, to highlight the character, and to enter the highlighted character as the next character.

* * * * *